United States Patent
McIntire et al.

(10) Patent No.: US 7,423,577 B1
(45) Date of Patent: Sep. 9, 2008

(54) SYSTEM AND METHOD FOR TRANSMITTING HIGH DATA RATE INFORMATION FROM A RADAR SYSTEM

(75) Inventors: William K. McIntire, Sandy, UT (US); Larry S. Thomson, Bountiful, UT (US); David H. Robbins, Bountiful, UT (US); James J. Boesch, Salt Lake City, UT (US)

(73) Assignee: L-3 Communications Corp.

( * ) Notice: Subject to any disclaimer, the term of this patent is extended or adjusted under 35 U.S.C. 154(b) by 0 days.

(21) Appl. No.: 11/592,536

(22) Filed: Nov. 3, 2006

Related U.S. Application Data

(60) Provisional application No. 60/733,859, filed on Nov. 3, 2005.

(51) Int. Cl.
*G01S 13/00* (2006.01)
*H04L 27/00* (2006.01)
*H04B 1/00* (2006.01)

(52) U.S. Cl. .................... 342/57; 375/145; 375/295
(58) Field of Classification Search .................. 342/57; 375/145, 295
See application file for complete search history.

(56) References Cited

U.S. PATENT DOCUMENTS

| | | | |
|---|---|---|---|
| 2,980,903 A | 4/1961 | Hagopian et al. | |
| 3,460,139 A | 8/1969 | Rittenbach | |
| 3,550,124 A | 12/1970 | Heft et al. | |
| 3,946,384 A | 3/1976 | Westaway | |
| 4,458,246 A | 7/1984 | Filipsson et al. | |
| 4,631,541 A * | 12/1986 | Prickett et al. | 342/195 |
| 4,733,238 A | 3/1988 | Fiden | |
| 4,816,834 A * | 3/1989 | Bjorke | 342/120 |
| 4,954,829 A | 9/1990 | Fiden | |
| 5,136,300 A * | 8/1992 | Clarke et al. | 342/175 |
| 5,646,907 A * | 7/1997 | Maccabee | 367/93 |
| 5,917,430 A | 6/1999 | Greneker, III et al. | |
| 6,285,681 B1 * | 9/2001 | Kolze et al. | 370/442 |
| 6,469,653 B1 | 10/2002 | Haynes | |
| 6,606,033 B1 | 8/2003 | Crocker et al. | |
| 6,690,741 B1 * | 2/2004 | Larrick et al. | 375/295 |
| 7,053,797 B2 | 5/2006 | Taylor | |
| 7,102,536 B2 | 9/2006 | Scholz | |
| 7,113,107 B2 | 9/2006 | Taylor | |
| 7,233,632 B1 * | 6/2007 | Kingston et al. | 375/327 |
| 2006/0291537 A1 * | 12/2006 | Fullerton et al. | 375/145 |

\* cited by examiner

*Primary Examiner*—Thomas H. Tarcza
*Assistant Examiner*—Harry Liu
(74) *Attorney, Agent, or Firm*—Kirton & McConkie; William T. Ralston

(57) ABSTRACT

A system and method for transmitting high data rate information from a pulsed radar is disclosed. The method includes collecting information using a mobile radar platform. The information is divided into a plurality of segments. Each segment is configured to fit within a time period less than a radar burst signal time period. Each segment is modulated onto a radar burst signal to form modulated radar burst signals. The modulated radar burst signals are transmitted from the pulsed radar system.

31 Claims, 3 Drawing Sheets

SYSTEM AND METHOD FOR TRANSMITTING HIGH DATA RATE INFORMATION FROM A RADAR SYSTEM

CROSS-REFERENCE TO RELATED APPLICATIONS AND CLAIM OF PRIORITY

Priority of U.S. Provisional patent application Ser. No. 60/733,859, filed on Nov. 3, 2005, is claimed, and is herein incorporated by reference in its entirety.

BACKGROUND

Advancements in broadband wireless communication have changed the way we live. People can now communicate and transfer information using techniques that were thought of only in science fiction literature a half century ago. A wide variety of communication resources is available for consumers, businesses, government, and military. For example, a typical consumer traveling in his car can communicate using his cell phone, listen to music over a virtually uninterrupted digital satellite radio signal while traveling cross country, receive broadband data at his computer over a WiMAX connection, and listen to a local traffic report using a high definition radio receiver.

Unfortunately, each of these means of communication typically requires the use of a separate antenna. It is very possible that a typical car, in the next 10 to 20 years, may include five to ten different antennas. Placement of that number of antennas on a car can be difficult, from both a stylistic and a functional point of view. Not only can the antennas appear unsightly, but they can also cause interference with other antennas, as well as requiring expensive wiring within the automobile between each antenna and its associated receiver.

Placement of antennas on commercial and military mobile platforms can be even more challenging. Even large military ships are often limited in the types of communication they can receive due to a lack of space available for associated antennas. Aircraft can be similarly limited. An aircraft designed to travel at high speeds may not have room for, or tolerance for an antenna designed for communicating high speed data over large distances. To overcome this problem, the military uses specialized ships and aircraft for transmitting and relaying information. While this solution generally works, it can be extremely expensive and can increase risk for soldiers in the battlefield.

SUMMARY

A system and method for transmitting high data rate information from a pulsed radar is disclosed. The method includes collecting information using a mobile radar platform. The information is divided into a plurality of segments. Each segment is configured to fit within a time period less than a radar burst signal time period. Each segment is modulated onto a radar burst signal to form modulated radar burst signals. The modulated radar burst signals are transmitted from the pulsed radar system.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One method for overcoming the electrical, spatial, and/or mechanical limitations inherent in the use of multiple antennas on a single platform is to use an antenna for multiple purposes. For example, an antenna designed for transmitting and receiving radar bursts can also be used to transmit and receive data. While transmitting data using a radar antenna has been previously described, the data transmission typically entailed sending a command comprising few bits. Such a system would not be useful in providing high data rate communication capabilities.

A mobile platform or fixed installation containing a radar system may not have a data communications system, or the existing communication system may be insufficient for the needs of the platform. Adding or upgrading a communication system typically entails adding hardware which incurs cost, adds weight, and involves modification of the platform structure (mounting antennas, for example). These additional requirements could be reduced or eliminated if components of the radar system could be exploited for use in data communications.

For example, an aircraft may be configured with a high performance radar which is capable of collecting synthetic aperture radar (SAR) images. Synthetic aperture radar can provide detailed, high definition images. Without a high bandwidth data link, these images typically cannot be downloaded from the aircraft until the aircraft has landed. The addition of a high-speed data communications link allows the image to be downloaded to a ground or airborne platform, or transmitted to a satellite while the aircraft is still in flight.

Some radar equipment (due, for example, to thermal constraints) cannot operate continuously, and is only capable of transmitting short bursts. This is true in the case of radars installed on certain aircraft today. The radar bursts, which can be as short as several hundred nanoseconds or as long as several hundred microseconds, can still be used to carry data despite the relatively short period of each burst. Ordinarily, data links configured to transmit large amounts of data use a continuous data signal. Transmitting large amounts of data using a bursted radar signal having short period bursts requires a different solution, since large data files, such as high definition photographs, cannot be transmitted over a single burst.

Figure 1:
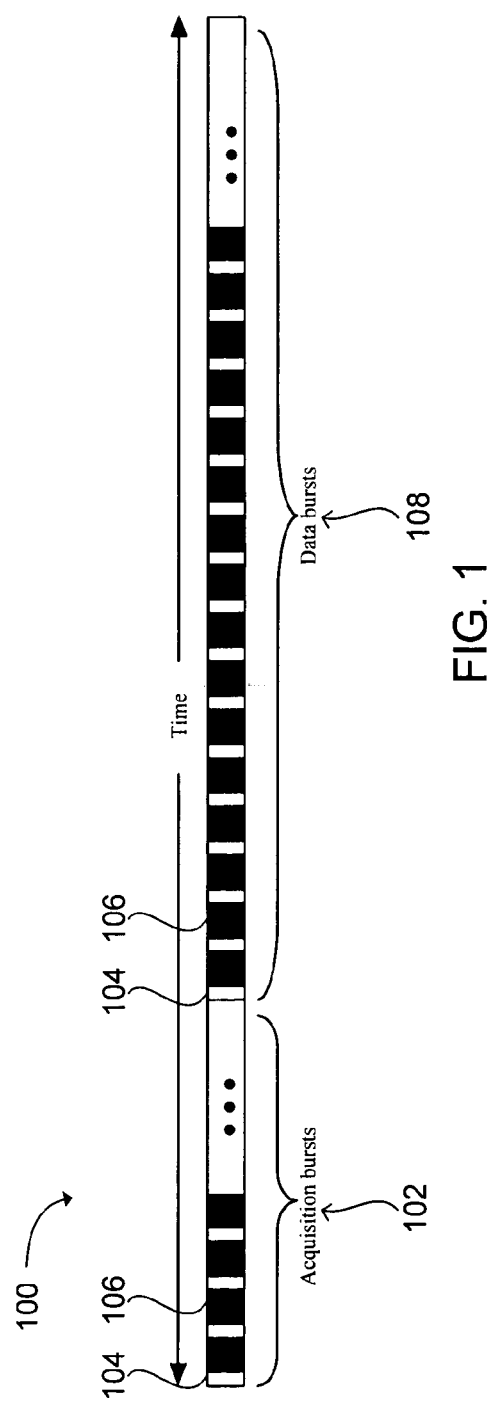
FIG. 1 is a block diagram illustrating a burst radar transmission comprising a continuous communication signal broken into segments in accordance with an embodiment of the present invention.

To transmit the continuous data signal in discrete bursts, the communication signal can be broken into segments. Each segment can be transmitted within the length of the transmit bursts. The maximum length of these bursts will usually be constrained by the radar RF hardware, such as the need for cooling. However, other constraints are also conceivable. Use of a substantially maximum length of each burst to transmit data can be desirable. This burst length, minus any guard intervals allowed at the beginning and end of the burst, can be used to determine the length of the communication signal segments. FIG. 1 shows an example of a burst radar transmission 100 comprising a continuous communication signal broken into segments.

The burst radar transmission 100 can be configured to carry data at high data rates. The transmission can includes a plurality of bursts having a transmit period 104 followed by a blanking period 106 during which the radar equipment can cool. The blanking period can be several times as long as the transmit period. In one embodiment, the blanking period can be twice as long as the transmit period, though a range of ratios are possible, depending on the characteristics of the hardware and data link management issues, as can be appreciated. The burst radar transmission can include one or more acquisition bursts 102. The acquisition bursts can include training sequences, frame synchronization sequences, and other sequences useful in synchronizing a receiver with the burst transmissions. The acquisition burst(s) can be followed by payload (data) bursts, configured to carry data at relatively high rates. This will be discussed more fully below.

The burst structure is typically configured to support synchronization of the burst radar transmission at a receiver. The term "synchronization" can be used in the context of several different processes:

1. Carrier frequency and phase estimation
2. Symbol timing acquisition
3. Burst synchronization, i.e. identifying the beginning (and perhaps end) of received bursts and frame synchronization, i.e. identifying the beginning of payload data within a burst.
4. File synchronization, i.e. identifying the beginning (and perhaps end) of a file that is being transmitted.

Each of these processes is discussed in the following paragraphs.

Carrier Frequency and Phase Estimation

A frequency offset between a received signal and a frequency source at a receiver can reduce the efficiency of the receiver. The frequency offset can be caused, for example, by imperfections in the frequency sources of the transmitter and receiver or a Doppler shift between the transmitter and receiver. The frequency offset can cause a change in phase between the carrier signal and the receiver frequency reference. Carrier phase may be completely unknown at the start of reception. A phase-locked loop (PLL) in a receiver can be used to track the carrier frequency and phase relative to the receiver frequency reference, as can be appreciated. In one embodiment, the PLL can be placed in a frozen or off state during the blanking periods of the radar. In another embodiment, the PLL can operate continuously. During the blanking period of the transmitter, the PLL at the receiver will receive noise if the PLL is allowed to run continuously. This can result in the PLL frequency estimate being less accurate. Thus, once boundaries of the burst transmission time have been determined, it can be beneficial to freeze the PLL during the transmitter blanking periods.

Symbol Timing Acquisition

Before any data can be demodulated, symbol timing is typically identified in the receiver so that it can integrate over a complete symbol without overlapping into adjacent symbols. This can be accomplished with, for example, an early-late gate mechanism. Symbol transitions are used to enable the acquisition of symbol timing. A constant stream of identical symbols will typically not allow symbol timing acquisition. Reasonably varied symbols (such as payload data) can be sufficient to drive this process, since symbol transitions are reasonably frequent. If extremely rapid acquisition is required, a sequence that transitions on every symbol (i.e. +1−1+1−1 . . . ) can be used.

Carrier frequency and phase and symbol timing can typically be acquired simultaneously. Random data or a sequence of alternating transitions, as described above, may be used to enable joint synchronization of carrier frequency and symbol timing.

Burst and Frame Synchronization

The receiver can be used to identify the point at which data starts at the beginning of a burst. To accomplish this, the transmitter can attach a synchronization sequence at the beginning of each burst. For example, a 16-symbol synchronization word can be used. The data can begin with the first symbol immediately following the last sync word symbol. This synchronization sequence can be known a priori to both the transmitter and receiver. The sync word can be made more effective using a sequence of symbols with good correlation properties, i.e. its autocorrelation is maximized with no offset, and its offset autocorrelation is minimized. Many such well-known sequences exist, with Neuman-Hofman and Barker sequences being examples. The same word can be used for both I and Q in a quadrature phase signal, although different words might be used to help resolve any I-Q ambiguity. Several other candidate words can also be used. An error correction code, such as a Reed-Solomon block code, can be used to encode the data to reduce errors in transmission.

The sync word can be located at the beginning of each burst. Alternatively, the sync word may only be used for initial acquisition, without the need to place the sync word in each burst. For example, a sync word may not be needed where the phase drift between the received signal and the receiver frequency reference is relatively small during the "off" periods of the radar transmitter. The receiver may be able to fine tune the symbol timing using random data. However, at high data rates, such as 274 Mbps, which results in approximately 3685 symbols transmitted in a 25 μs burst, 16 bits of synchronization information per burst is about 0.5% overhead. This is small enough that it may be worth the added simplicity and reliability to include a sync word in every burst, even if placement of a sync word in every burst is not necessary.

If the burst begins with the sync word, and data immediately follows, then one can consider burst and frame sync to essentially be the same thing, since knowledge of one can result in knowledge of the other without requiring any additional information.

File Synchronization

A synthetic aperture active-element radar located on a mobile platform, such as an aircraft or satellite, can be used to provide detailed images of surfaces and areas. In one embodiment, the same radar can be used to provide discrete file transfer from the mobile platform to a ground station or mobile receiver using the active-element radar. To accomplish a successful download, the receiver typically identifies the beginning of the file. There are multiple ways of accomplishing this.

In one embodiment, a unique sync word can be inserted at the physical layer. For example, after transmit bursts dedicated to carrier and symbol synchronization have passed, the first burst carrying the file can begin with the burst sync word, immediately followed by the file sync word, after which the file contents can be transmitted. The receiver, after achieving frequency and symbol lock, can look for the file sync word after every burst sync word encountered.

An alternative approach to file synchronization can be accomplished without the use of a separate file sync word. For example, the system may reliably acquire carrier and symbol sync with one burst. It can then be assumed that the file to be transmitted begins with the second burst, with no additional start-of-file information being required.

In another embodiment, it may be advantageous to have file synchronization completely removed from the physical layer, with the start-of-file identified by a process at a higher level layer. In this embodiment, the modem can be ignorant of the start and stop times of data transmission. Higher layer applications and protocols, such as FTP, TCP/IP, and GFP, are commonly used to identify a beginning and ending point in data file transmission.

Synchronization with Radar Hardware

A modem is typically used to modulate data onto a carrier signal to form a communication signal. It is convenient if the modem is able to control the timing of the transmit periods in the RF hardware. This way, synchronization of the communication signal segments with the radar burst transmit periods 104 is easily accomplished. In some cases, however, this is not possible. Certain modern radar systems in use today present just such a case, wherein the radar cannot accept control of the transmit periods from an external source. In this case, the radar hardware can provide some sort of gate signal so that the modem can know the timing of the transmit burst periods. The radar hardware may also provide a reference clock signal to which the gate signal is synchronized.

Figure 2A:
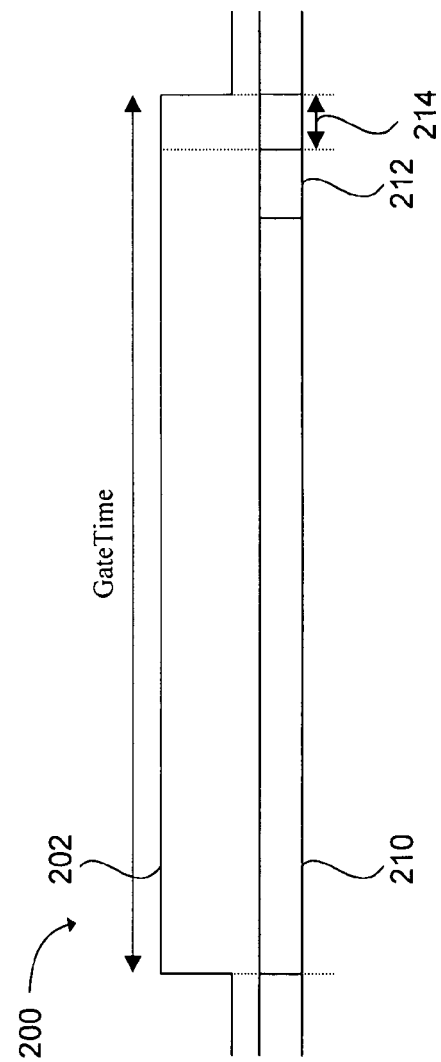
FIG. 2a is a block diagram illustrating a burst radar transmission comprising an acquisition signal segment in accordance with an embodiment of the present invention.
Figure 2B:
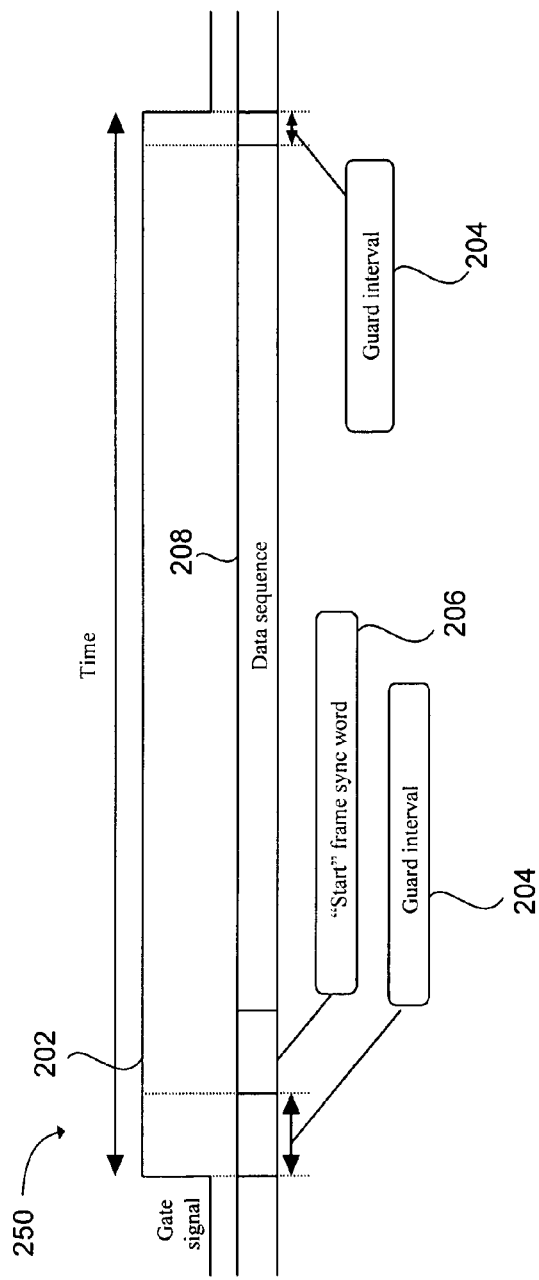
FIG. 2b is a block diagram illustrating a burst radar transmission comprising a communication signal segment in accordance with an embodiment of the present invention.

FIGS. 2a and 2b show one embodiment of a gate signal 202. The gate signal 202 can be provided by the RF hardware to the modem. An acquisition signal segment 200, shown in FIG. 2a and a communication signal segment 250, shown in FIG. 2b, can be synchronized to the gate signal. The gate signal may be continuously provided by the RF hardware to the modem. Alternatively, a reference clock can be provided by the radar radio frequency equipment (RFE) or some other source within the RF hardware. The gate signal can be made synchronous with this reference clock signal. The communications modem can therefore use this clock for a reference, and upon receiving any gate signal rising edge, the modem can predict future rising and falling edges by counting clock cycles, without the need for further gate signal detection.

The acquisition signal segment 200 can include an idle sequence 210 that can be transmitted during the acquisition pulse to enable carrier and symbol acquisition. The idle sequence can be a sequence well suited for rapid acquisition, such as an alternating +1, −1 sequence, or some other alternating sequence configured to enable rapid acquisition. Additionally, a stop frame sync word 212 can be included at the end of the acquisition burst to signal an end of the burst. The receiver can acquire the burst timing by detecting the stop frame sync word. If the PLL continues tracking through the "off" periods without the loop diverging too much, then the stop sync word may be unnecessary. A guard period 214 can be located between the stop sequence and the end of the acquisition burst. The guard period can be just long enough to ensure that the tail of the data doesn't get clipped.

The communication signal segment 250, as shown in FIG. 2b, can include guard intervals 204 at the beginning and end of the burst, a synchronization sequence 206, and a data sequence 208. The guard intervals may be of identical lengths at the beginning and end of each burst, or alternatively, the intervals may have different lengths. For example, a guard period at the end of the burst can be used to protect against clipping of data and may have a length of 200 nanoseconds (ns). A guard period at the beginning of the burst can be used to enable a power amplifier to become substantially stable prior to data being modulated onto the burst signal. The guard period at the beginning of the burst may have a length of 300 ns after the rising edge of the array driver gate signal. The actual length of the guard period is dependent on the design of the transmitter. Alternatively, the guard intervals at the beginning and/or ending of the communication signal segment may be omitted.

The synchronization sequence 206 can act as a start sequence. A receiver can be configured to know that the first data to follow the start sequence is the data sequence, which may include control information or source payload data. The sync sequence can be kept relatively short to minimize the amount of overhead in the communication signal segment. Paradoxically, the higher the rate at which data is transmitted, the more efficient the transmission of data can be using brief radar bursts as carriers. For example, for a burst duration having a length of 25 microseconds, the following data rate statistics, which assume QPSK modulation, can be derived:

Example # 1: High Rate

Data rate: 274 Mbps

Symbol rate: 137 Msymbols/sec

Burst duration: 25 microseconds

Burst size: 3425 symbols

Sync word length: 16 symbols

Sync word fraction of burst: 0.5%

Example #2: Medium Rate

Data rate: 10 Mbps

Symbol rate: 5 Msymbols/sec

Burst duration: 25 microseconds

Burst size: 125 symbols

Sync word length: 16 symbols

Sync word fraction of burst: 12.8%

Example #3: Low Rate

Data rate: 1.28 Mbps

Symbol rate: 640 ksymbols/sec

Burst duration: 25 microseconds

Burst size: 16 symbols

Sync word length: 16 symbols

Sync word fraction of burst: 100%

Example #4: Even Lower Rate

Data rate: 80 kbps

Symbol rate: 40 ksymbols/sec

Burst duration: 25 microseconds

Burst size: 1 symbol

Sync word length: Doesn't matter

Sync word fraction of burst: Much longer than a burst

It is shown that a rate of greater than 1.28 Mbps is required to transmit any data beyond a 16 bit sync word on a 25 microsecond burst. At relatively high rates, such as 274 Mbps, the amount of overhead devoted to synchronization, about 0.5%, becomes relatively insubstantial. Thus, to transfer large data files, such as SAR image files, over a reasonable amount of time, a relatively high data rate is needed to minimize the amount of overhead in each burst that is used to synchronize a receiver to the signal.

Transmitting at a high data rate, however, typically entails the design of a system configured to transmit a signal having a relatively high signal to noise density ratio. A communication signal should have a sufficient amount of energy in each bit transmitted to enable the receiver to distinguish between received symbols. Thus, as the rate of bits transmitted increases, so should the amount of power. Transmitting a communication signal at a rate of 274 Mbps can use over 200 times more power than transmitting at a rate of 1.28 Mbps when all other system variables are held constant.

The large amount of power used to transmit at high data rates over relatively short pulse times, especially when the data is transmitted over substantial distances, would typically restrict the use of an antenna that is designed to transmit short pulses from being used to transmit high data rates. Indeed, pulsed radar systems on mobile platforms have not previously been used for relatively high data rate transmission of information.

However, certain types of radar hardware located on mobile platforms have sufficient power to transmit at high enough data rates to enable large data files to be transferred over a relatively short amount of time and at a sufficient power to enable a receiver over 100 miles from the transmitter to receive the signal. For example, an active-element radar comprised of hundreds or thousands of elements can be configured to transmit relatively high power radar pulses. The active-element radar can have a fairly small cross section, enabling the radar to be used in small, maneuverable aircraft. Each element can output several watts of power. Antenna gain can enable an active-element radar system to have an equivalent isotropic radiated power (EIRP) of well over one megawatt, sufficient to transmit high data rates over short radar pulses for a substantial distance. Other types of antennas can also be used, such as parabolic dish type antennas, assuming they have sufficient power to transmit at relatively high data rates for fairly short burst periods. The actual power necessary to transmit is dependent upon such things as the data rate, the size of the burst, the antenna gain of the transmitter and receiver, the distance between the transmitter and receiver, the directivity of the transmitter, and so forth.

The sync sequence 206 can be present at the beginning of each burst. However, a sync sequence may not be necessary in every burst. The sync word may only be used for initial acquisition when the phase drift during the blanking periods of the radar is small. Additionally, the receiver may be able to fine tune the symbol timing using random or pseudorandom data. However, at high data rates such as 274 Mbps, with only 0.5% overhead in a 16 bit sync word, use of a sync sequence in each burst may be worthwhile due to the added simplicity of fine tuning using a known sequence. At lower data rates, it may be more beneficial to use a sync sequence only for initial acquisition. Alternatively, the sync word can be placed in every nth burst, where n is a positive integer, enabling a receiver to fine tune symbol timing at every nth burst.

Figure 3:
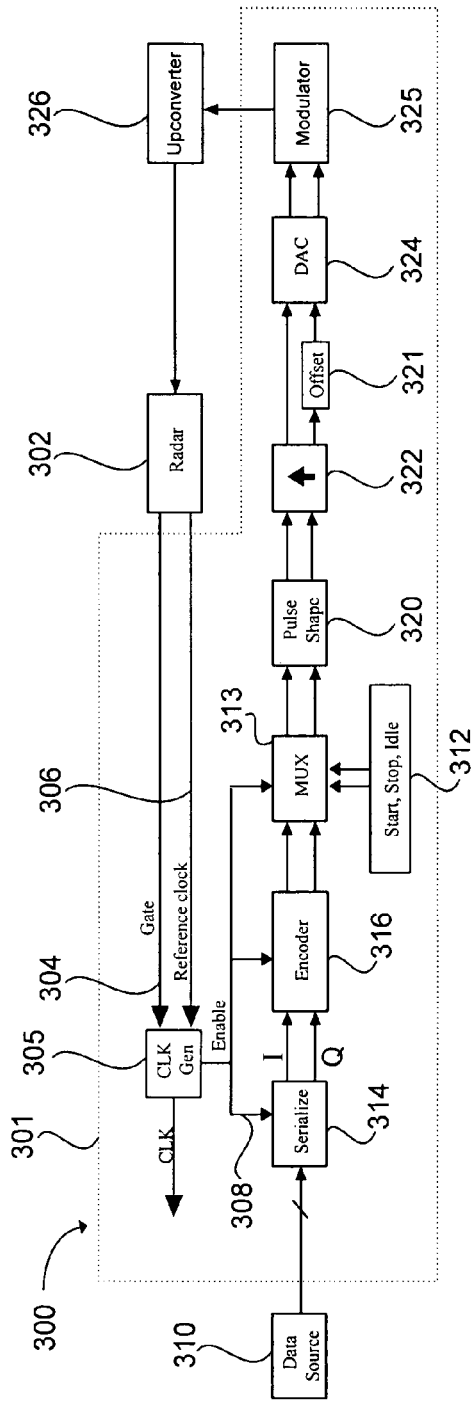
FIG. 3 is a block diagram illustrating a radar system configured to transmit a continuous communication signal over a plurality of bursts in accordance with an embodiment of the present invention.

FIG. 3 illustrates one embodiment of a radar system 300 configured to transmit a continuous communication signal over a plurality of bursts. The transmit burst times can be controlled by the radar RF hardware in the radar 302. A gate signal 304, which identifies the beginning and end of the radar transmit periods, along with a reference clock signal 306, which is synchronized with the gate signal, can be provided by the radar RF hardware and received by the modem 301. The modem shown in this example does not include a complete disclosure of modem processes. An Enable signal 308 from a clock generator 305 in this diagram provides a mechanism by which the communications signal is segmented.

Data can flow from a data source 310 external to the modem. The data can include any type of information, such as information contained in digital or analog signals, or control information such as MAC addresses. The data may be collected and stored in a data file. Alternatively, data can be transmitted as it is acquired. The data can also be generated internally as acquisition or synchronization data, or other control information, as shown in the box labeled "Start, Stop, Idle" 312. In one embodiment, the flow of the data, along with the modem processes such as serialization 314 and FEC coding 316, can proceed only when the "Enable" signal is actuated. These processes can effectively stop, or freeze, whenever the "Enable" signal is not actuated. With the "Enable" signal driven by the reference clock signal from the RF hardware, with proper adjustments made to accommodate guard periods needed for amplifier stabilization, hardware propagation, and so forth, the data can be effectively segmented and synchronized with the RF transmit burst periods.

When the enable signal 308 is actuated, data from the data source 310 can be serialized 314, encoded 316 with a block forward error correction code or some other type of encoding, and multiplexed with acquisition and/or synchronization data 312. The serialize block may output data on both an I and a Q channel. Alternatively, a single channel may be output. The data can then be pulse shaped 320, upsampled 322, and converted from digital to analog 324. In one embodiment, an offset 321 can be placed on one of the I and Q channels to provide for offset quadrature phase shift key (OQPSK) modulation. Of course, a variety of different types of modulation can be used for transmitting data on radar pulses. The data can be modulated 325 onto the radar pulses using digital or analog modulation techniques by varying the phase, frequency, or amplitude of a carrier signal.

The baseband data can be upconverted 326 to an intermediate frequency (IF) and sent to the radar 302 for transmission during the burst periods. The upconverter is shown outside the modem 301 for purposes of this example. The upconverter can also be placed inside the modem as can be appreciated.

In one embodiment, the active-element radar can be electronically steered by adjusting the phase of the plurality of elements, as can be appreciated. This enables the radar to be used to transmit to a receiver in a desired direction without altering the direction of the mobile radar platform.

Figure 4:
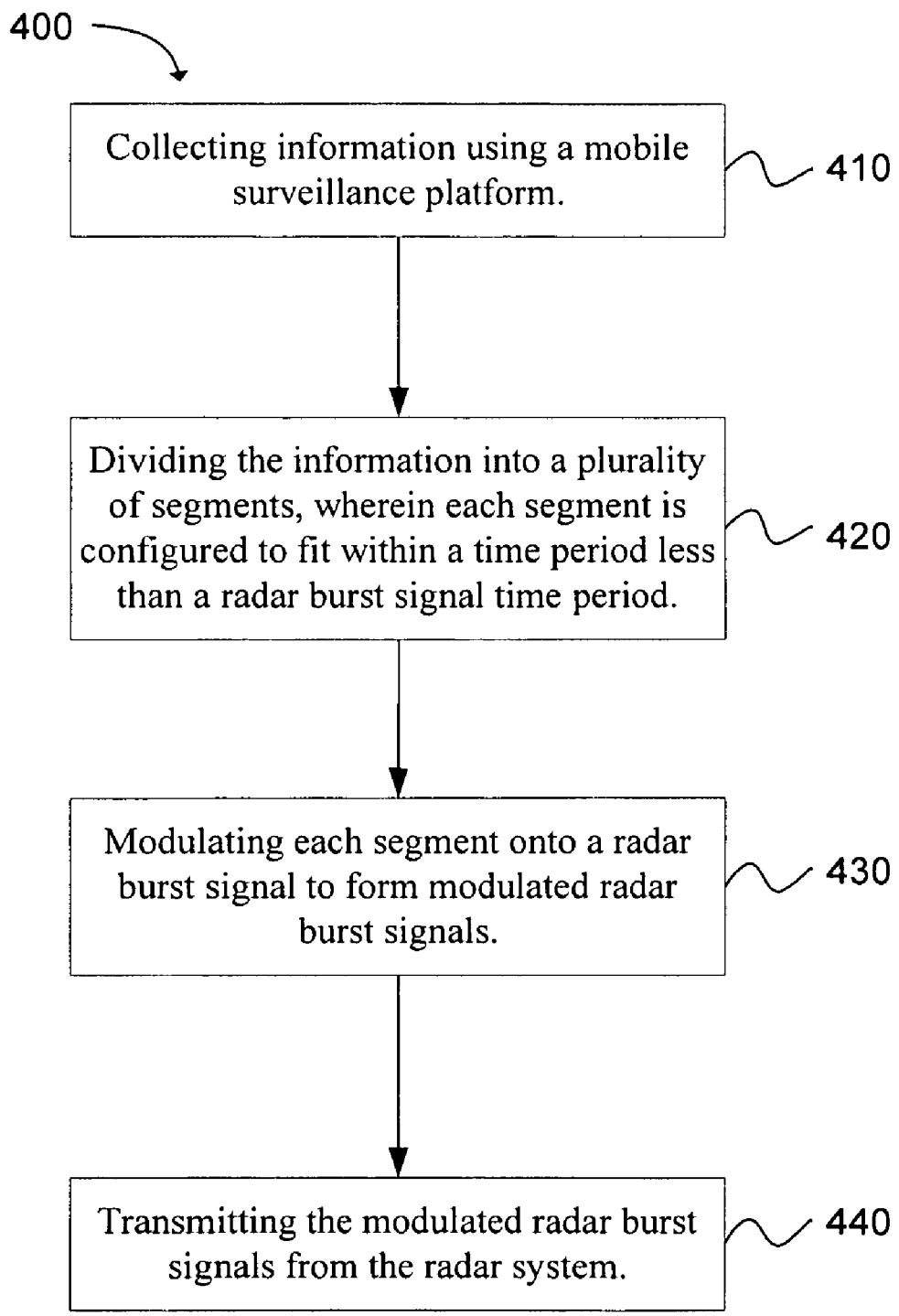
FIG. 4 is a flow chart depicting a method for transmitting high data rate information from a pulsed radar system in accordance with an embodiment of the present invention.

Another embodiment of the invention provides a method 400 for transmitting high data rate information from a pulsed radar system, as shown in the flow chart of FIG. 4. The method includes the operation of collecting information using a mobile radar platform, as shown in block 410. The mobile radar platform can include aircraft, helicopters, lighter than air ships, ships, ground based vehicles, or other types of mobile radar platforms having a limited amount of space for placement of antennas.

For example, as vehicles and roadways become "smart", radar use will likely become ubiquitous to enable control of vehicles and sensing of the exterior environment. Data that is collected by the vehicle can be shared with other vehicles and sensors using the radar antenna. This enables data to be shared without the need for another antenna to be used to transmit and receive.

A further operation includes dividing the information into a plurality of segments, wherein each segment has a time period less than a radar burst signal time period, as shown in block 420. As previously discussed, a modem can be controlled using a clock and/or gate signal provided by radar hardware. The length of the gate signal can be equal to or closely related to a radar burst period. Guard periods can be added at the beginning of the gate period to enable power amplifier to settle and to reduce or eliminate clipping of data at the end of the gate period.

An additional operation provides modulating each segment onto a radar burst signal to form modulated radar burst signals, as shown in block 430. The segments can be modulated onto a series of consecutive bursts until all of the segments have all been transmitted. Alternatively, the data segments can be transmitted on every nth burst, where n is a positive integer. For example, data can be sent on odd data burst signals while using even data burst signals for transmitting unmodulated radar pulses. This can enable a radar system to transmit high speed data and transmit and receive radar pulses simultaneously. In another embodiment, the data segments can be transmitted in groups of modulated radar pulses followed by groups of unmodulated radar pulses. For example, data can be sent on each burst signal for a period of n data burst signals, followed by a period in which the burst signals can be left unmodulated, enabling the burst signals to be used to collect radar information. Transmitting the data in groups can be advantageous when one or more bursts are needed for a receiver to sync with the incoming data burst signals.

Additional information can be included in the modulated radar burst signal to enable a receiver to receive the data in the modulated radar burst signal. The additional information can include, but is not limited to, a start frame synch word, a stop frame synch word, a file start synch word, acquisition data such as an idle sequence, and so forth. The idle sequence can be a sequence well suited for rapid acquisition, such as an alternating +1, −1 sequence, or some other alternating sequence configured to enable rapid acquisition.

A further operation includes transmitting the modulated radar burst signals from the radar system, as shown in block 440. The radar burst waveform can be configured to require little to no changes to a receiving antenna. The receiving antenna can receive the radar burst waveform having modulated data at a power sufficient to detect the symbols. The data can be transmitted at a sufficient rate to reduce overhead within the modulated radar burst signals to a desirable level.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for transmitting high data rate information from a pulsed radar system, comprising:
   collecting information via radar pulse reflections of unmodulated bursts using a mobile radar platform;
   dividing the information into a plurality of segments, wherein each segment is configured to fit within a time period less than a radar burst signal time period;
   modulating each segment onto a radar burst signal to form modulated radar burst signals; and
   transmitting the modulated radar burst signals from the radar system wherein the modulated radar burst signals are interspersed between the unmodulated bursts to provide substantially simultaneous collection and transmission of the information.

2. A method as in claim 1, further comprising modulating each segment onto the radar burst signal using a modem.

3. A method as in claim 2, wherein the modem is controlled using a gate signal provided by the radar system, wherein the gate signal corresponds to the radar burst signal time period.

4. A method as in claim 3, further comprising modulating each segment onto the radar burst signal when the gate signal is actuated.

5. A method as in claim 1, further comprising modulating each segment onto a radar burst signal during the radar burst signal time period based on a reference clock provided by the radar system.

6. A method as in claim 2, further comprising adding an end guard interval to an end of the gate signal, wherein the end guard interval has a width sufficient to ensure data transmitted during the gate signal is not clipped.

7. A method as in claim 2, further comprising adding a start guard interval to a beginning of the gate signal, wherein the start guard interval has a width sufficient to enable a power amplifier in the radar system to become substantially stable prior to data being modulated onto the radar burst signal.

8. A method as in claim 1, further comprising transmitting a synchronization sequence during the burst signal time period.

9. A method as in claim 8, further comprising transmitting the synchronization sequence to enable a receiver to acquire at least one of burst synchronization, frame synchronization, symbol timing, and file synchronization.

10. A method as in claim 8, further comprising transmitting the synchronization sequence, wherein the synchronization sequence is known to the radar system and a receiver prior to transmission of the modulated radar burst signals.

11. A method as in claim 8, further comprising transmitting the synchronization sequence, wherein the synchronization sequence is configured to be maximized when there is no offset in an autocorrelation and minimized when the autocorrelation is offset.

12. A method as in claim 1, further comprising transmitting at least one acquisition burst configured to enable a receiver to acquire symbol timing.

13. A method as in claim 12, further comprising transmitting the acquisition burst, wherein the acquisition burst comprises an idle sequence configured for rapid acquisition.

14. A system for transmitting high data rate information from radar equipment, comprising:
   a pulsed radar mounted on a mobile radar platform configured to transmit a plurality of burst radar signals comprising interspersed modulated bursts and unmodulated bursts and to collect radar data based on the burst radar signals;
   a modem coupled to the pulsed radar to form the modulated bursts and configured to receive a gate signal from the pulsed radar associated with a radar burst signal time period of the burst radar signal; and
   a data source coupled to the modem to provide modulation data to the modem, wherein the modem is configured to divide the modulation data into a plurality of data segments, with each data segment configured to fit within the radar burst signal time period, wherein the modulation data is the radar data collected by the pulsed radar.

15. A system as in claim 14, wherein the modem is configured to modulate the plurality of data segments onto the plurality of radar burst signals to form modulated radar burst signals.

16. A system as in claim 15, wherein a synchronization word is added to every modulated radar burst signal.

17. A system as in claim 16, wherein the synchronization word provides less than 5 percent of the bits modulated onto a radar burst signal.

18. A system as in claim 16, wherein the synchronization word provides less than 20 percent of the bits modulated onto a radar burst signal.

19. A system as in claim 15, wherein a synchronization word is added to every nth modulated radar burst signal, where n is a positive integer.

20. A system as in claim 15, wherein greater than 1,000 symbols are transmitted during the burst signal time period.

21. A system as in claim 20, wherein the burst signal time period is less than 10 microseconds.

22. A system as in claim 20, wherein the burst signal time period is less than 200 microseconds.

23. A system as in claim 14, wherein the modem is configured to modulate the plurality of data segments onto every nth radar burst signal, wherein n is a positive integer.

24. A system as in claim 14, wherein the modem is configured to modulate the plurality of data segments onto a grouping of burst signals, wherein the grouping of burst signals is a plurality of burst signals separated by a plurality of unmodulated burst signals.

25. A system as in claim 14, wherein the pulsed radar has an equivalent isotropic radiated power of greater than 500 kilowatts.

26. A system as in claim 14, wherein the mobile radar platform is selected from the group consisting of aircraft, helicopters, lighter than air ships, ships, and ground based vehicles.

27. A method as in claim 1, wherein the collecting information comprises performing synthetic aperture radar image processing.

28. A method as in claim 1, wherein the transmitting the modulated radar burst signals comprises transmitting modulated bursts separated by an unmodulated burst.

29. A method as in claim 1, wherein the transmitting the modulated radar burst signals comprises transmitting the modulated bursts as every nth burst, other bursts being unmodulated, wherein n is a positive integer.

30. A method as in claim 1, wherein the transmitting the modulated radar burst signals comprises transmitting a group of n consecutive modulated bursts separated by at least one unmodulated burst, wherein n is a positive integer.

31. A system as in claim 14, wherein the pulse radar comprises a synthetic aperture radar.

* * * * *